United States Patent [19]

Lehto et al.

[11] Patent Number: 5,368,624
[45] Date of Patent: Nov. 29, 1994

[54] METHOD AND APPARATUS FOR EQUALIZING THE TEMPERATURE PROFILE OF GLASS SHEETS IN A ROLLER-EQUIPPED FURNACE INCLUDED IN A HORIZONTAL TEMPERING PLANT

[75] Inventors: Esko O. Lehto, Kangasala; Jukka H. Vehmas; Jorma K. J. Vitkala, both of Tampere, all of Finland

[73] Assignee: Tamglass Engineering Oy, Tampere, Finland

[21] Appl. No.: 75,566
[22] PCT Filed: Dec. 20, 1991
[86] PCT No.: PCT/FI91/00404
§ 371 Date: Jun. 16, 1993
§ 102(e) Date: Jun. 16, 1993
[87] PCT Pub. No.: WO92/12099
PCT Pub. Date: Jul. 23, 1992

[30] Foreign Application Priority Data

Dec. 27, 1990 [FI] Finland .................. 906398

[51] Int. Cl.⁵ .......................................... C03B 27/044
[52] U.S. Cl. ..................................... 65/29.19; 65/111; 65/114; 65/161; 65/162; 65/349
[58] Field of Search ................ 65/29, 111, 114, 119, 65/161, 162, 349, 350

[56] References Cited

U.S. PATENT DOCUMENTS 4,620,864 11/1986 McMaster ............................ 65/114
4,946,491 8/1990 Ban ..................................... 65/161
5,057,138 10/1991 Vehmas et al. .................... 65/111

*Primary Examiner*—Joye L. Woodard
*Attorney, Agent, or Firm*—Burns, Doane, Swecker & Mathis

[57] ABSTRACT

The invention relates to a method and apparatus for equalizing the temperature profile of glass sheets in a roller-equipped furnace included in a horizontal tempering plant. At least in the early stage of a heating cycle, the upper surface of a glass sheet is exposed to an intensified convection heat effect by blasting air into the furnace from blasting pipes (3) located close to the upper surface of a glass sheet. This blasting compensates for the vigorous heat transfer to the lower surface of a glass sheet in the early stage of a heating cycle, which is caused by hot rollers. The blasting range and spot is manoeuvred in the longitudinal direction of a furnace in a manner that, at any given time, the blasting is only applied to that longitudinal section of a furnace in which a movable glass sheet is located at a given time.

11 Claims, 2 Drawing Sheets

METHOD AND APPARATUS FOR EQUALIZING THE TEMPERATURE PROFILE OF GLASS SHEETS IN A ROLLER-EQUIPPED FURNACE INCLUDED IN A HORIZONTAL TEMPERING PLANT

BACKGROUND AND SUMMARY OF THE INVENTION

The present invention relates to a method for equalizing the temperature profile of glass sheets in a roller-equipped furnace included in a horizontal tempering plant, wherein the glass sheets are carried on a horizontal level by means of a conveyor consisting of horizontal rollers through a furnace, the opposite surfaces of a glass sheet being exposed to a conduction, convection and radiation heat effect caused by resistance elements, rollers or the like furnace components fitted above and below a glass sheet whereby, in order to equalize the total heat effect applied to the upper and lower surfaces of a glass sheet, the upper surface of a glass sheet is exposed at least in the early stage of a heating cycle to an intensified convection heat effect by blasting air into the furnace near the upper surface of a glass sheet as narrow jets which, through the injector action, create a turbulent flow of the hot air contained in the furnace along the upper surface of a glass sheet.

The invention relates also to an apparatus for equalizing the temperature profile of glass sheets in a roller-equipped furnace included in a horizontal tempering plant, said apparatus comprising a furnace, heating resistances thereinside for maintaining the furnace temperature close to a glass softening temperature, horizontal rollers inside the furnace for supporting a horizontal class sheet and providing a conveyor therefor, as well as a blasting manifold above a bearing surface consisting of the rollers for blasting heat-equalizing air into the furnace.

This type of method and apparatus are prior known from the Applicant's U.S. Pat. No. 4,390,359. In this prior known apparatus, a convection blasting manifold is used to prevent the arching of a glass sheet. When a cold piece of glass is brought into a hot, roller-equipped furnace having a temperature of more than 700° C., the glass will first vigorously curve in a manner that the glass edges rise upwards. This is a natural phenomenon as the rollers deliver heat to the glass more rapidly from below than what is received by the glass from the top section of a furnace. The reason for this is a high conduction of heat from rollers to glass, which together with the convection and radiation heat below the class results in the fact that the amount of heat transferred to the lower surface of glass exceeds that transferred to the upper surface of glass through convection and radiation. This is why a convection blasting manifold is used to create forced convection on the upper surface of glass so as to compensate for the higher heat transfer to glass from below.

Thereafter, the convection blasting has been developed further in a manner that the air to be blasted is preheated in the proximity of rollers below the glass by passing a blasting-air supply pipe through a space below the glass. This method is disclosed in more detail in the Applicant's Patent application FI 894191. This prior method involves a principle of picking up the preheating heat from rollers and from air below the glass. This method was capable of increasing the power of convection blasting while decreasing the amount of air to be blasted.

Although a convection blasting method has been capable of substantially improving the quality of glass obtained from a horizontal tempering plant, the method nevertheless still involves certain deficiencies:

When oscillating glass from end to end in a furnace, the ends of loadings have been hotter than the other parts. This can be explained by the fact that convection blasting heats the rollers instead of the upper surface of glass whenever the glass does not lie upon the rollers. This is what happens at the ends of a furnace during the oscillating movement of glass. As a consequence of this, the temperatures in the ends of glasses at the ends or gables of a furnace are higher than in the rest of a load. The trailing end of a last piece of glass and the leading end of a first one can have temperatures which are up 15–20° C. higher hotter than the temperature in the rest of the batch. This results in a so-called pleating effect, i.e. each end of a piece of glass in the glass advancing direction tends to bend to an arched shape, as shown in FIG. 2. Uneven or unequal heating leads also to a non-uniform grain distribution.

When oscillating glass on a certain section of the length of a furnace (the glass shifting stepwise forward so that the oscillating spot travels gradually from inlet to outlet end in a furnace), there will occur situations when the furnace only contains e.g. just one minor-sized piece of glass (e.g. an automotive side window). Thus, convection blasting heats nearly all rollers contained in a furnace. This will increase the temperature of rollers only to pronounce the arching effect and this, again, requires more convection blasting. This problem has only been corrected after a lengthy loading (rollers have been cooled by loading), with a lot of incorrect glass produced by this time. The situation will be particularly problematic when starting the production of a small series without preparing for a high waste percentage.

When subjecting a furnace to heavy loading, the rollers begin to cool. The rollers may even cool to such a degree that the glass receives less heat from below than from above, even if convection blasting were not used at all. A consequence of this is the curving or arching of glass downwards and, if the rollers are allowed to cool even further, the result will be a situation that glass begins to shatter in a chiller at the tempering stage. If the cooling of rollers were even or uniform (equal cooling in each roller), the problem would not be too serious but the heating of rollers could be intensified during the unloaded period of a furnace by keeping the convection blasting switched on (when oscillating from end to end in a furnace, there is always an unloaded period between batches so that the furnace would have time to reach the thermal equilibrium lost upon loading). An often encountered problem is, however, that the rollers in a certain section cool more rapidly than the other rollers. One factor contributing to this is e.g. the way a furnace is loaded. The problem zone is generally the mid-section rollers of a furnace (in the case of large-size glasses) and the rollers in the proximity of a loading gate (in the case of thin glasses and heavy loading). In these cases, it would be important to only intensify the heating of rollers within a certain section.

A common aspect to all above problems is that it must be possible to focus the convection blasting on a right spot at a right time. It is also essential that the convection effect be as effective as possible with as small an amount of air as possible since the ample use of blasting air creates further problems. First of all, the discharging air produces an extra heat load on undesired spots, leading to problems in terms of sealing and bearing systems. In addition, the air to be blasted must be heated to the temperature of the furnace air, which requires heating effect. The ample use of air colder than the furnace air may also produce problematic, hard-to-control flows in the furnace.

SUMMARY OF THE INVENTION

The above problems are resolved according to the invention by means of such a blasting manifold, which makes it possible to blast air only from those pipes it is necessary to blast air from in a given situation. This is accomplished in a manner that each blasting pipe is fitted outside a furnace with an ON/OFF-closing valve that can be operated in a programmed or manual way. In a normal operation, the valves open and close according to the movement of glass in a manner that, when the glass lies within the range of action of a certain pipe, the valve is open. Accordingly, when there is no glass in register with the pipe, the valve is closed. Thus, it is possible to minimize the undesired heating of certain rollers.

A method and apparatus of the invention can also be utilized during the unloaded period of a furnace e.g. in a manner that, when the rollers at the loading end of a furnace can be expected to be cooled more than the other rollers, the blasting pipes of this particular section are used to blast pre-heated air to the rollers for a certain period of time. This is to avoid the problem that, under a long-term continuous loading, the breakage of glass begins to increase due to the fact that the rollers at the loading end cool more rapidly than the other rollers. The air blasted during an unloaded period must absolutely be pre-heated since, otherwise, the above-mentioned drawbacks caused by the ample use air become pronounced since the blasting during an unloaded period, as compared to the preceding use of blasting air, means actually importing "extra" air into a furnace space.

BRIEF DESCRIPTION OF THE DRAWINGS

A few embodiments of the invention will now be described by way of examples with reference made to the accompanying drawings, in which.

DETAILED DESCRIPTION OF PREFERRED EMBODIMENTS

Inside a furnace 1, above the glass-supporting level consisting of rollers 2 are mounted compressed-air pipes 3 made of heat-resistant steel. Pipes 3 are disposed transversely to the advancing direction of glass, i.e. in the same direction as rollers 2. Each transverse compressed-air pipe 3 is provided with holes having a diameter of approximately 1 mm disposed horizontally or slightly downwards and directed in both directions, the distance therebetween being approximately 100 mm. The blasting pressure in pipes 3 is approximately 3-5 bars. The narrow air jets discharging from the holes of pipes 3 create a turbulent flow of hot air contained in the furnace along the upper surface of a glass sheet. This in turn intensifies the transfer of heat through convection heat effect to the upper surface of glass.

Figure 1:
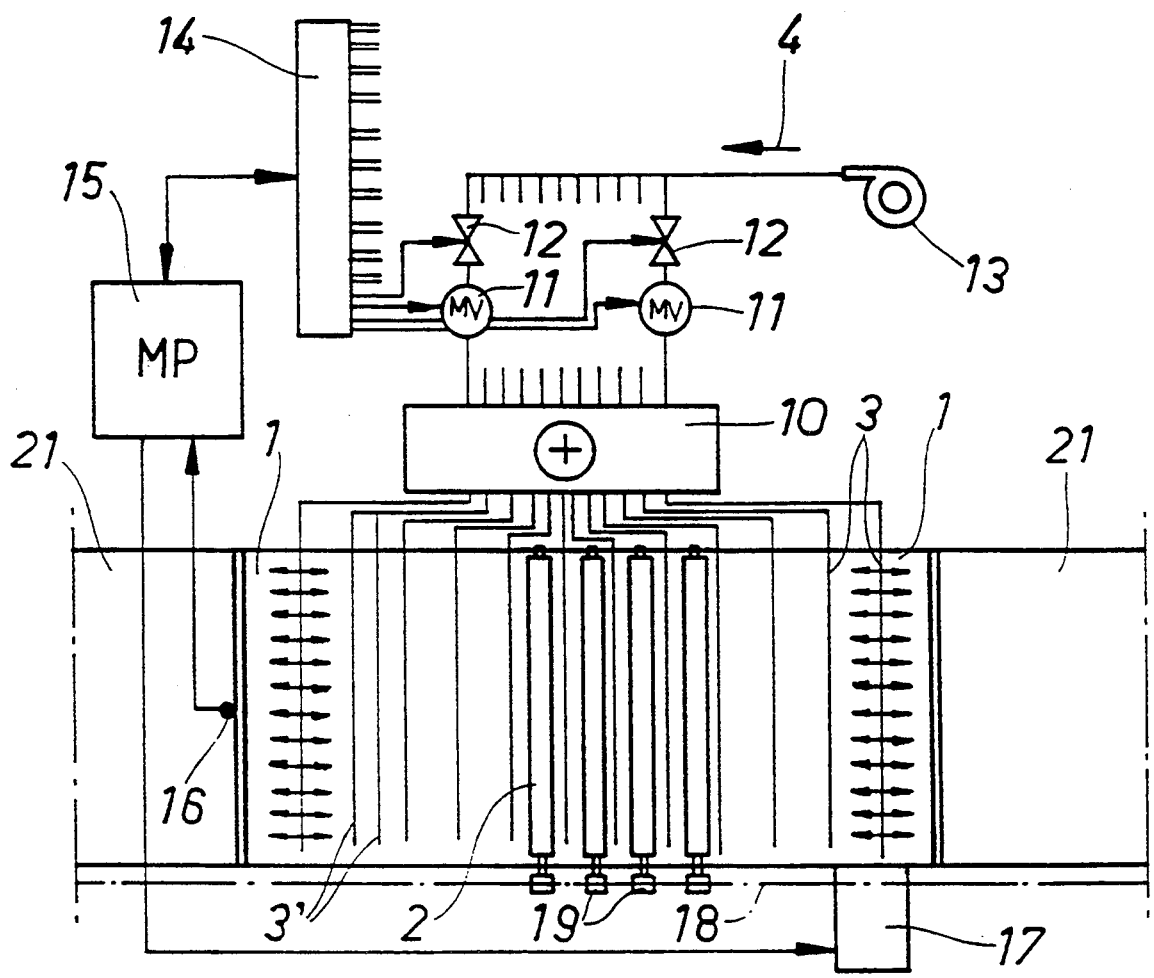
FIG. 1 shows an apparatus of the invention schematically in a plan view.
Figure 3:
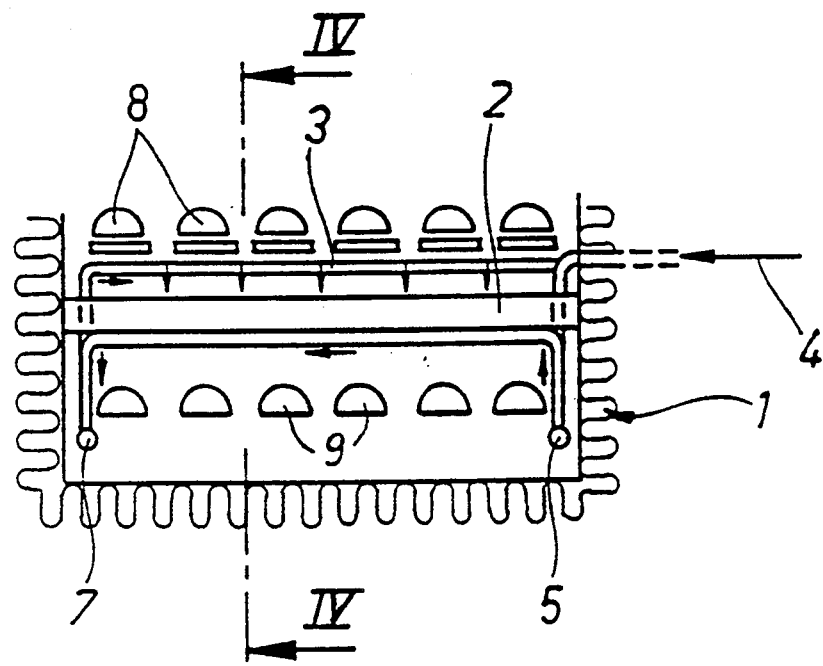
FIG. 3 shows a schematic cross-section of a furnace for applying a method of the invention.
Figure 4:
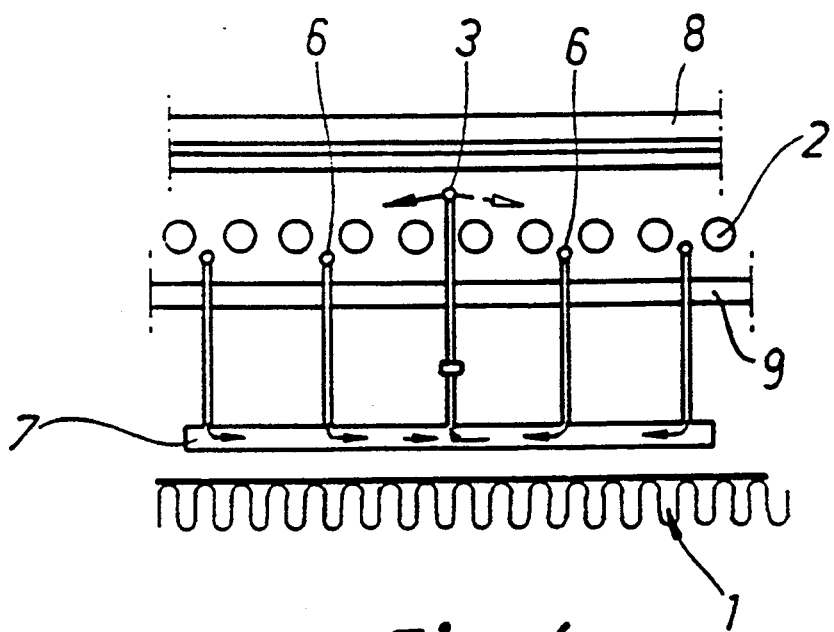
FIG. 4 shows a longitudinal section of the furnace shown in FIG. 3 along a line IV—IV.

However, the supply of compressed air indicated by an arrow 4 does not proceed directly into pipes 3. In the case of FIG. 1, the air is first delivered e.g. through an electrically heated pre-heater 10. In the case of FIGS. 3 and 4, the air is delivered into a distributing pipe 5, extending longitudinally of the furnace and provided with a plurality of tubes 6, extending transversely of the furnace and positioned below a bearing surface consisting of rollers 2, at every other space between rollers, or e.g. above resistances 8. By way of tubes 6, the air advances into a manifold 7 provided with blasting pipes 3. When passing through tubes 6 the air is pre-heated and, at the same time, it cools rollers 2 and a space below a glass sheet. It should be noted that just some of the pipes 5, 6, 7 can be designed as shown in FIG. 3. In most cases, the air is pre-heated by means of pipes running above resistances 8 as this is easier to carry out.

In addition, said furnace 1 (FIGS. 3, 4) is conventionally provided with upper heating resistances 8 and lower heating resistances 9. Pipe systems 3 and 6 are located between resistances 8, 9 and rollers 2. Pipe systems 3, 6 are located as close to the rollers as possible and have a small mass so as not to have a significant effect on the thermal equilibrium of a furnace themselves but, during a blasting operation, they can be used for effectively and momentarily decreasing heat transfer to the lower surface and increasing it to the upper surface.

In view of focusing the convection blasting essentially only on that particular area, where a piece of glass is lying upon the rollers at any given time, each blasting pipe 3 is fitted with an ON/OFF valve 11, located outside a furnace and comprising e.g. a magnetic valve. On the other hand, said valves 11 are controlled by means of relays or electronic switches contained in a control block 14, the latter being in turn controlled by means of a microprocessor 15. The microprocessor 15 is in turn continuously informed about the location of a batch or a load, contained in the furnace and consisting of a glass sheet or a plurality of glass sheets. Therefore, an electric eye 16 detects and informs said microprocessor 15 of the fact that the trailing edge of a glass sheet travelling from a loading table 21 into furnace 1 passes said eye 16. Thereafter, said microprocessor 15 controls a motor 17, which rotates rollers 2 back and forth through the intermediary of a belt or a chain 18. Thus, the microprocessor 15 is all the time informed of the location of a glass sheet in furnace 1 at any given time. The same applies also to a load consisting of a plurality of glass sheets as such a load can be conceived as one large glass sheet. On the basis of the positional information of a glass sheet, said microprocessor 15 controls magnetic valves 11 to open and close in a manner that, in normal operation, said valves 11 open and close according to the movement of glass. Each valve 11 is only open at the time a glass sheet is in register with a corresponding pipe 3. Other valves 11 are closed. This is to minimize the undesired heating of certain rollers. With rather thick glasses and with oscillation being effected from end to end in a furnace, the issue is primarily about avoiding the excessive heating of end rollers. On the other hand, e.g. with 4 mm glasses in a long-term continuous loading, the rollers of a loading end may cool more rapidly than the other rollers to increase the breakage of glass sheet. The invention offers an improvement on this problem in a manner that during the unloaded periods between loading operations said pipes 3 are used to blast pre-heated air either to all rollers 2 or only to the rollers at the inlet end of a furnace so as to even up or equalize the temperatures of rollers. During an uploading period, the blasting on rollers should be time-wise limited by means of an automatic blast cut-off limiter in order not to overheat the rollers in manual operation.

At least over certain lengthwise sections of a furnace it is possible to join two or three blasting pipes 3' behind a common valve 11, the combination of two or three pipes 3' receiving a common control. It is also possible that Dust some of pipes circulate in a furnace as shown in FIGS. 3 and 4 while some of them are passed directly on top of the rollers without pre-heating effected in a furnace. When using a pre-heater 10, said shut-off valves 11 must be positioned upstream of that, since normal valves do not withstand high temperatures.

As disclosed in the cited U.S. Pat. No. 4 390 359, the same valves 11 can also be used for cutting off convection blasting in the middle of a heating cycle. If desired, it is also possible to employ throttle valves 12, controlled in a manner that more air is blasted at the early stage than at the final stage of heating. In addition, the pre-setting of throttle valves 12 can be utilized for pre-adjusting the blasting conditions to be best possible for each type of glass sheet and loading technique.

A piece of glass heated as uniformly as possible by the application of a method and apparatus of the invention is carried from furnace 1 into a subsequent tempering station 21, wherein a glass sheet is conventionally rapidly cooled by blasting cooling air to both surfaces of a glass sheet. Naturally, the invention can also be applied in the production of heat-strengthened glass obtained with a slower cooling rate.

Figure 2:
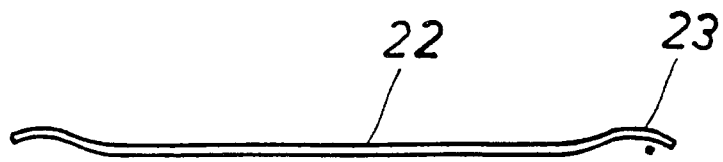
FIG. 2 is a side view of a glass sheet having its ends bent as a result of a so-called pleat effect.

Significance of the invention is still briefly described in the following. The method is capable of producing more hemothermal glass so as to reduce a pleat effect (FIG. 2). In addition, the hemothermal glass facilitates tempering of glass since the breakage of glasses in a chiller is decreased and the grain size of broken glass will be more uniform. The method also serves to facilitate the heating operation of difficult glasses, such as large quadratic glasses, since the furnace will be more hemothermal. The convection blasting itself will be more effective, since the power of blasting is not undermined by heating the rollers unnecessarily.

By means of blasting during an unloaded period it is possible to raise the total capacity of a furnace as a result of both a reduction in heating times and unloaded periods and the elimination of empty loadings and like pauses.

It is obvious that the invention is not limited to the above-described embodiment but a plurality of changes and modifications can be to its structural design within the scope of the annexed claims.

We claim:

1. A method for equalizing the temperature profile of glass sheets in a roller-equipped furnace included in a horizontal tempering plant, comprising the steps of:

carrying a glass sheet horizontally through a furnace on a conveyor consisting of horizontal rollers;

exposing upper and lower surfaces of said glass sheet to a heat effect by resistance elements fitted in said furnace above and below said glass sheet and said rollers blasting air into said furnace near said upper surface as narrow jets which, through injector action, create a turbulent flow of hot air contained in said furnace near said upper surface, wherein said upper surface is exposed at least in an early stage of heating to an intensified convection heat effect to equalize a total heat effect applied to the upper and lower surfaces of the glass sheet, wherein the blasting of air is directed from a plurality of pipes arranged successively in a longitudinal direction as one of individual pipes and pipe arrays consisting of at least two pipes;

sensing a position of said glass sheet being carried on said rollers; and controlling said blasting of air from said pipes by selectively opening and closing valves connected to each pipe or pipe array responsive to the sensed position of said glass sheet in the furnace, wherein the blasting is only applied to a longitudinal section of said furnace in which the glass sheet is located.

2. A method as set forth in claim 1, further comprising the steps of sensing said furnace in an unloaded condition and operating said valves to produce a local blasting at least at one of the inlet end and a middle section of said furnace.

3. A method as set forth in claim 1, further comprising the step of pre-heating the air blasted into said furnace to a temperature in a range of 670°–720° C.

4. An apparatus for equalizing the temperature profile of glass sheets in a roller-equipped furnace included in a horizontal tempering plant, said apparatus comprising;

a furnace;

heating resistances inside said furnace for maintaining a furnace temperature close to a glass softening temperature horizontal rollers inside the furnace for supporting and conveying a horizontal glass sheet through said furnace;

a blasting manifold above a glass sheet beating surface defined by said rollers for blasting heat-equalizing air into the furnace, said blasting manifold comprising a plurality of blasting pipes arranged successively in a longitudinal conveying direction of said furnace; valves fitted in said pipes for controlling a flow of blasting air through said pipes; and sensor means for sensing a position of a glass sheet in said furnace, wherein said valves are operatively coupled to said sensor means so that air blasting through said pipes is only applied to it longitudinal section of said furnace in which a glass sheet is located.

5. An apparatus as set forth in claim 4, further comprising means for controlling said blasting manifold during unloaded periods between loading cycles of said furnace wherein said valves of blasting pipes located at least at one of an inlet end and middle of said furnace are controlled to open to apply a convection heat effect at least temporarily to the rollers at least at one of the inlet end and middle of said furnace.

6. An apparatus as set forth in claim 5, further comprising blasting-air preheaters, said blasting-air preheaters comprising elongated pipe extensions of said blasting pipes located within the furnace between and air and a blasting point of the blasting pipes.

7. An apparatus as set forth in claim 4 further comprising blasting-air preheaters, said blasting-air preheaters comprising elongated pipe extensions of said blasting pipes located within the furnace between an air inlet and a blasting point of the blasting pipes.

8. An apparatus as set forth in claim 7, wherein said blasting pipes further include a throttle valve.

9. An apparatus as set forth in claim 4, further comprising a blasting-air preheater located outside said furnace, all of said blasting pipes extending through said preheater and said valves being fitted in said pipes upstream of said preheater.

10. An apparatus as set forth in claim 4, wherein said blasting pipes further include a throttle valve.

11. An apparatus as claimed in claim 4, wherein the blasting pipes of the blasting manifold are arranged as a plurality of pipe arrays, each array having at least two pipes connected to a supply pipe, the control valve being fitted to the supply pipe.

* * * * *